United States Patent
Dugas et al.

(10) Patent No.: US 11,457,563 B2
(45) Date of Patent: Oct. 4, 2022

(54) HARVESTER STABILITY MONITORING AND CONTROL

(71) Applicant: Deere & Company, Moline, IL (US)

(72) Inventors: Bryan E. Dugas, Thibodaux, LA (US); Rahul Gunda, Pune (IN); Dipankar D. Dongare, Pune (IN); Kiran Bachhav, Pune (IN)

(73) Assignee: DEERE & COMPANY, Moline, IL (US)

( * ) Notice: Subject to any disclaimer, the term of this patent is extended or adjusted under 35 U.S.C. 154(b) by 695 days.

(21) Appl. No.: 16/454,643

(22) Filed: Jun. 27, 2019

(65) Prior Publication Data
US 2020/0404842 A1    Dec. 31, 2020

(51) Int. Cl.
*A01D 41/127*      (2006.01)
*A01D 41/14*       (2006.01)
(Continued)

(52) U.S. Cl.
CPC ........ *A01D 41/1274* (2013.01); *A01B 69/003* (2013.01); *A01B 69/007* (2013.01); *A01D 41/14* (2013.01); *A01D 57/20* (2013.01); *A01B 63/1006* (2013.01); *A01B 69/008* (2013.01); *A01D 41/141* (2013.01); *A01D 75/18* (2013.01); *A01F 12/46* (2013.01); *A01F 25/20* (2013.01);
(Continued)

(58) Field of Classification Search
CPC ........ G05D 2201/0201; G05D 1/0212; G05D 15/02; G05D 6/02; A01B 69/008; A01B 69/007; A01B 69/003; A01B 63/1006; G01G 19/00; G01G 5/003; A01D 75/18; A01D 57/20; A01D 45/10; A01D 43/07; A01D 41/141; A01D 41/14; A01D 41/1274; A01D 41/127; A01F 12/46; A01F 25/20
See application file for complete search history.

(56) References Cited

U.S. PATENT DOCUMENTS

| | | |
|---|---|---|
| 4,042,132 A | 8/1977 | Bohman et al. |
| 5,575,316 A | 11/1996 | Pollklas |

(Continued)

FOREIGN PATENT DOCUMENTS

| | | | | |
|---|---|---|---|---|
| CN | 110352391 A | * | 10/2019 | ............ A01B 69/00 |
| DE | 102009027245 A1 | * | 12/2010 | ........... A01D 43/073 |

(Continued)

*Primary Examiner* — Arpad Fabian-Kovács
(74) *Attorney, Agent, or Firm* — Michael Best & Friedrich LLP

(57) ABSTRACT

A controller for a harvester receives a speed of the harvester, the pitch, the yaw and the roll of the vehicle body, compares the sensed yaw, pitch and roll of the vehicle body to respective acceptable yaw, pitch and roll ranges. The controller also receives a conveyor position respect to the vehicle body, compares the conveyor position to an acceptable range of conveyor positions, calculates a center of gravity of the harvester based upon the yaw, pitch, roll and conveyor position, and compares the speed of the harvester to an acceptable range of speeds based upon the calculated center of gravity of the harvester. The controller also sends a signal to move the conveyor with respect to the vehicle body, alert the user to move the conveyor with respect to the vehicle body, reduce the speed of the harvester, or alert the user to reduce the speed of the harvester.

20 Claims, 8 Drawing Sheets

(51) Int. Cl.
  *A01B 69/00* (2006.01)
  *A01D 57/20* (2006.01)
  *A01D 75/18* (2006.01)
  *A01B 69/04* (2006.01)
  *G05D 1/02* (2020.01)
  *A01B 63/10* (2006.01)
  *G05B 6/02* (2006.01)
  *G05B 15/02* (2006.01)
  *G01G 5/00* (2006.01)
  *G01C 9/02* (2006.01)
  *G01G 19/00* (2006.01)
  *A01F 12/46* (2006.01)
  *A01F 25/20* (2006.01)

(52) U.S. Cl.
  CPC .............. *G01C 9/02* (2013.01); *G01G 5/003* (2013.01); *G01G 19/00* (2013.01); *G05B 6/02* (2013.01); *G05B 15/02* (2013.01); *G05D 1/0212* (2013.01); *G05D 2201/0201* (2013.01)

(56) References Cited

U.S. PATENT DOCUMENTS

| | | | |
|---|---|---|---|
| 5,666,793 A * | 9/1997 | Botti | A01B 79/005 |
| | | | 56/DIG. 15 |
| 6,682,416 B2 | 1/2004 | Behnke et al. | |
| 8,161,718 B2 * | 4/2012 | Bussmann | A01D 41/127 |
| | | | 56/10.2 G |
| 8,930,039 B2 * | 1/2015 | Murray | A01D 41/127 |
| | | | 701/1 |
| 9,315,212 B1 | 4/2016 | Kyrtsos et al. | |
| 9,615,501 B2 * | 4/2017 | Pickett | A01B 69/004 |
| 9,901,031 B2 * | 2/2018 | Mott | A01D 41/127 |
| 10,588,258 B2 * | 3/2020 | Jung | G05B 6/02 |
| 2020/0094874 A1 * | 3/2020 | Sights | A01B 69/008 |
| 2020/0128740 A1 * | 4/2020 | Suleman | A01D 90/10 |

FOREIGN PATENT DOCUMENTS

| | | | | |
|---|---|---|---|---|
| EP | 0070015 A1 | | 1/1983 | |
| EP | 1051898 A2 * | 11/2000 | | A01D 41/127 |
| EP | 2208965 A2 * | 7/2010 | | A01D 75/28 |
| EP | 3804486 A1 * | 4/2021 | | B60K 1/00 |
| KR | 102112694 B1 * | 5/2020 | | A01D 41/1208 |
| WO | WO-2004076267 A1 * | 9/2004 | | B62D 55/116 |

* cited by examiner

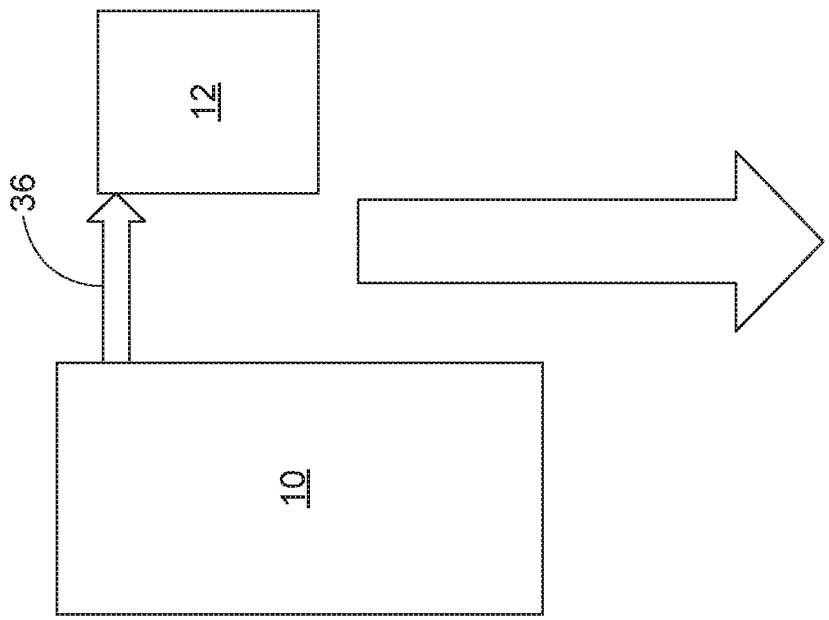
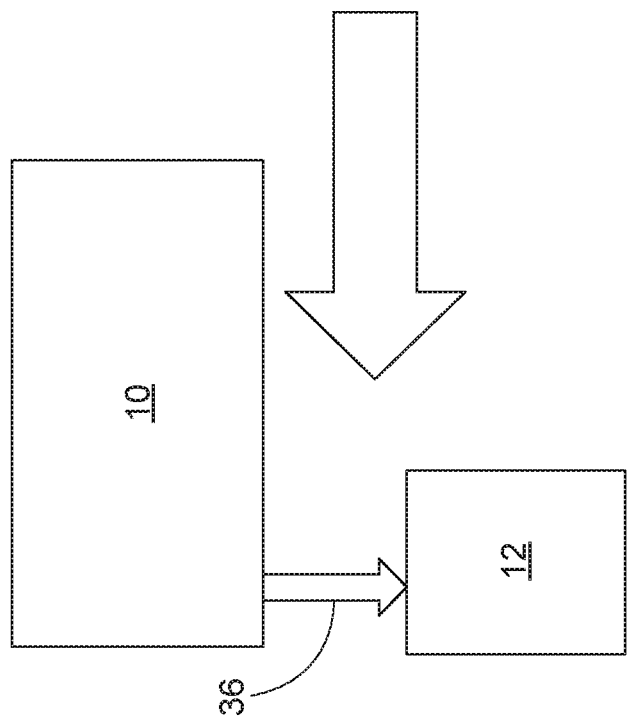
FIG. 5

HARVESTER STABILITY MONITORING AND CONTROL

BACKGROUND

The present disclosure relates to stability monitoring and control of harvesters.

SUMMARY

In some embodiments, the disclosure provides a control system for a harvester including a vehicle body and a conveyor connected to the vehicle body for rotation with respect to the vehicle body. The control system includes a first sensor that senses a speed of the harvester, a second sensor that senses a pitch and a yaw of the vehicle body, a third sensor that senses a position of the conveyor with respect to the vehicle body, an actuator connected to the conveyor and the vehicle body to rotate the conveyor with respect to the vehicle body, and a controller in electrical communication with the first sensor, the second sensor, the third sensor and the actuator. The controller receives a first signal from the first sensor indicative of the speed of the harvester, receives a second signal from the second sensor indicative of the pitch and the roll of the vehicle body, compares the sensed pitch of the vehicle body with respect to an acceptable range of pitch positions of the vehicle body, compares the sensed roll of the vehicle body to an acceptable range of roll positions of the vehicle body, receives a third signal from the third sensor indicative of the position of the conveyor and with respect to the vehicle body, compares the sensed position of the conveyor with respect to the vehicle body to an acceptable range of conveyor positions, calculates a center of gravity of the harvester based upon to the second signal and the third signal, and compares the sensed speed of the harvester to an acceptable range of speeds based upon the calculated center of gravity of the harvester. The controller also sends a signal to execute at least one action from the following subset of actions in response to the sensed speed of the harvester being greater than the acceptable range of speeds based upon the calculated center of gravity of the harvester: move the conveyor with respect to the vehicle body, alert the user to move the conveyor with respect to the vehicle body, reduce the speed of the harvester, and alert the user to reduce the speed of the harvester.

In some embodiments, the disclosure provides a control system for a harvester including a vehicle body and a conveyor connected to the vehicle body for rotation with respect to the vehicle body. The control system includes a first sensor that senses a speed of the harvester, a second sensor that senses a pitch and a roll of the vehicle body, a third sensor that senses a position of the conveyor with respect to the vehicle body, an actuator connected to the conveyor and the vehicle body to rotate the conveyor with respect to the vehicle body, a user interface including a steering device, a cutting method selection device, and a cutting mode selection device, and a controller in electrical communication with the first sensor, the second sensor, the third sensor, the actuator and the user interface. The controller receives a first signal from the first sensor indicative of the speed of the harvester, receives a second signal from the second sensor indicative of the pitch and the roll of the vehicle body, compares the sensed pitch of the vehicle body to an acceptable range of pitch positions of the vehicle body, and compares the sensed roll of the vehicle body to an acceptable range of roll positions of the vehicle body. The controller also receives a third signal from the third sensor indicative of the position of the conveyor and with respect to the vehicle body, compares the sensed position of the conveyor with respect to the vehicle body to an acceptable range of conveyor positions, calculates a center of gravity of the harvester based upon the second signal and the third signal, compares the sensed speed of the harvester to an acceptable range of speeds based upon the calculated center of gravity of the harvester, and compares a first input from the steering device to an acceptable turning radius based upon the sensed speed of the harvester, and the calculated center of gravity of the harvester. The controller also sends a signal to execute at least one action of the following subset of actions in response to the sensed speed of the harvester being greater than an acceptable speed based upon the calculated center of gravity of the harvester: move the conveyor with respect to the vehicle body, alert the user to move the conveyor with respect to the vehicle body, reduce the speed of the harvester, and alert the user to reduce the speed of the harvester. The controller additionally determines a desired position of the conveyor with respect to the vehicle body based upon a second input from the cutting method selection device, and a third input from the cutting mode selection device, and sends a signal to the actuator to move the conveyor to the desired position.

In some embodiments, the disclosure provides a harvester having a vehicle body, a conveyor connected to the vehicle body for rotation with respect to the vehicle body, an actuator that rotates the conveyor with respect to the vehicle body, a first sensor that senses a speed of the harvester, a second sensor that senses yaw, pitch and roll of the vehicle body, a third sensor that senses a position of the conveyor with respect to the vehicle body, and a controller in electrical communication with the actuator, the first sensor, the second sensor and the third sensor. The controller receives a first signal from the first sensor indicative of the speed of the harvester, receives a second signal from the second sensor indicative of the pitch, the yaw and the roll of the vehicle body, compares the sensed yaw of the vehicle body to an acceptable yaw range, compares the sensed pitch of the vehicle body to an acceptable pitch range, and compares the sensed roll of the vehicle body to an acceptable roll rang. The controller also receives a third signal from the third sensor indicative of the position of the conveyor and with respect to the vehicle body, compares the sensed position of the conveyor with respect to the vehicle body to an acceptable range of conveyor positions, calculates a center of gravity of the harvester based upon to the second signal and the third signal, and compares the sensed speed of the harvester to an acceptable range of speeds based upon the calculated center of gravity of the harvester. The controller also sends a signal to execute at least one action of the following subset of actions when the sensed speed of the harvester is greater than an acceptable speed based upon the calculated center of gravity of the harvester: move the conveyor with respect to the vehicle body, alert the user to move the conveyor with respect to the vehicle body, reduce the speed of the harvester, and alert the user to reduce the speed of the harvester.

Other aspects of the disclosure will become apparent by consideration of the detailed description and accompanying drawings.

BRIEF DESCRIPTION OF THE DRAWINGS

FIG. 5 is a schematic view of an alternative face cutting mode.

DETAILED DESCRIPTION

Before any embodiments of the disclosure are explained in detail, it is to be understood that the disclosure is not limited in its application to the details of construction and the arrangement of components set forth in the following description or illustrated in the following drawings. The disclosure is capable of other embodiments and of being practiced or of being carried out in various ways.

Figure 1:
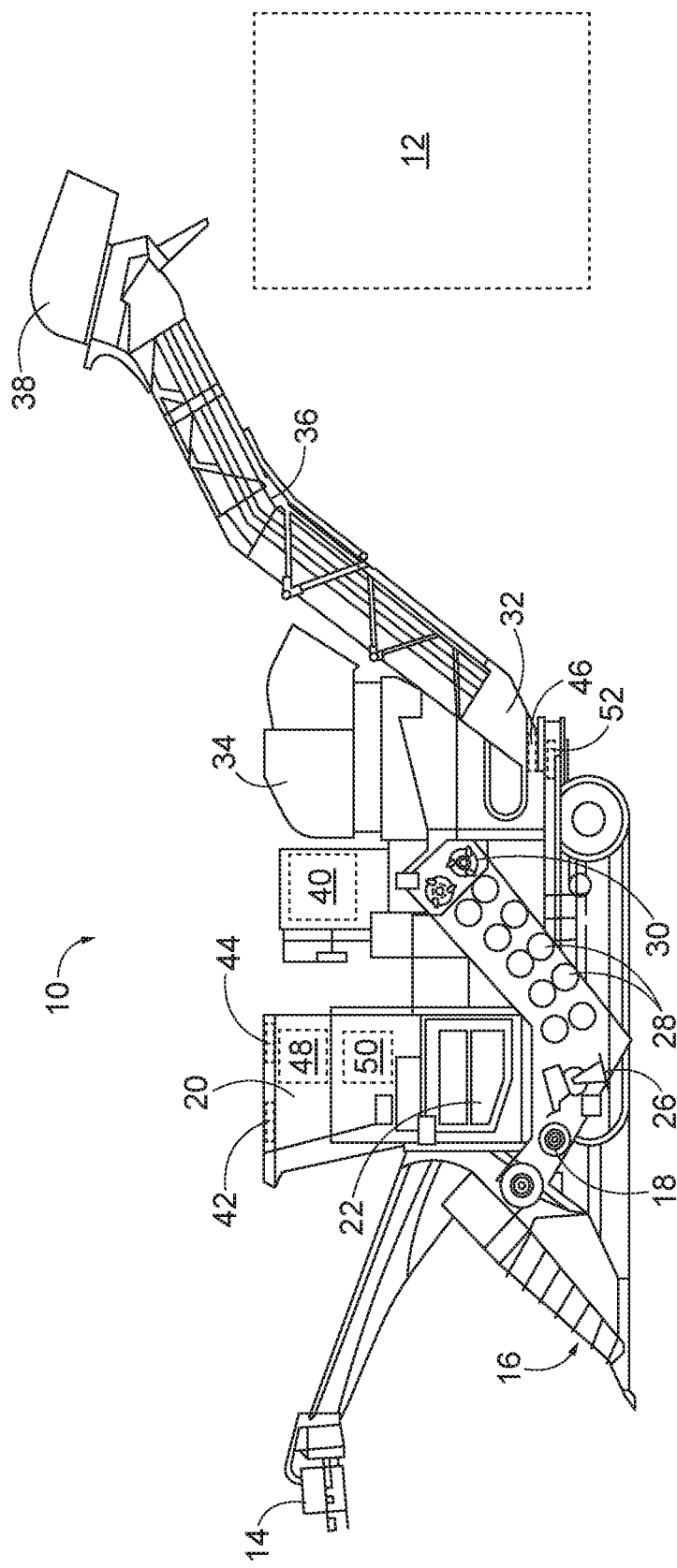
FIG. 1 is a side view of a harvester according to some embodiments.
Figure 2:
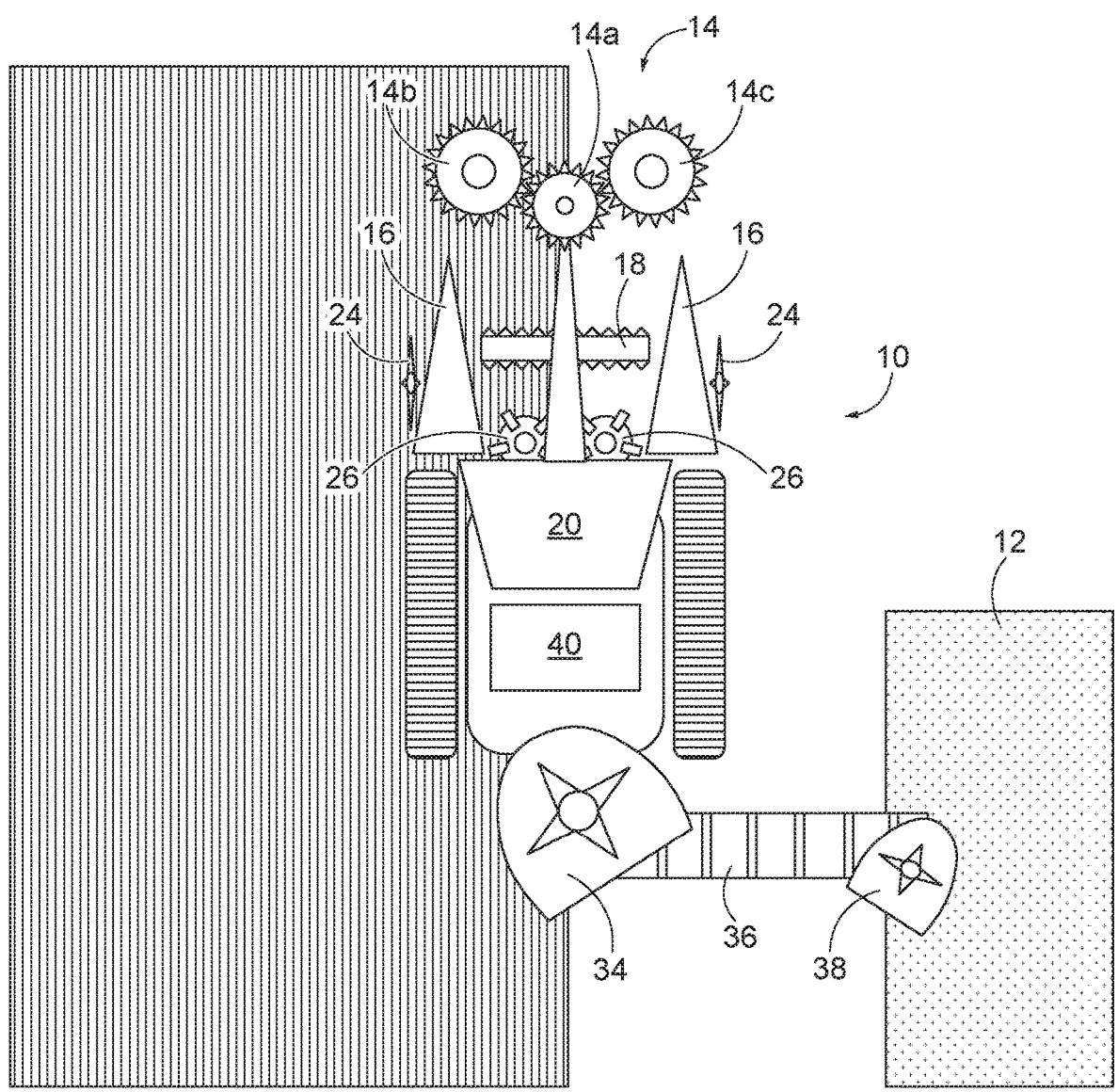
FIG. 2 is a top view of the harvester of FIG. 1.

FIGS. 1 and 2 illustrate a sugar cane harvester 10 for harvesting sugar cane and a wagon 12 for retaining the harvested sugar cane. The illustrated harvester 10 includes a topper 14, crop dividers 16, a knockdown roller 18, a cab 20, an engine 22, side knives 24, base cutters 26, feed rollers 28, a chopper 30, a basket 32, a primary extractor 34, a conveyor 36, a secondary extractor 38, a first sensor 42, a second sensor 44, a third sensor 46, a user interface 48, a controller 50, and an actuator 52. In some embodiments, other harvesters can be utilized in place of the illustrated sugar cane harvester 10. In still other embodiments, any conveyor structure for transporting loose material, such as mining which moves loose rocks, can be utilized in place of the illustrated sugar cane harvester 10.

FIG. 2 illustrates the unharvested crop with a plurality of vertical lines and the harvested crop as the absence of vertical lines. As shown in FIG. 2, the unharvested crop is positioned on the left of the harvester 10.

The topper 14 cuts leaves off of the top of the crops. The illustrated topper 14 includes a center disk 14a, a left side disk 14b and a right side disk 14c. The center disk 14a rotates to discharge cut tops of the crops to the portion of the field that has already been harvested. In FIG. 2, the center disk 14a rotates clockwise to discharge cut crops onto the right of the harvester 10. The left side disk 14b and the right side disk 14c in FIG. 2 rotate counter clockwise to discharge cut crops to the right side of the harvester. In some embodiments, all three of the disks 14a, 14b and 14c are powered, but in other embodiments, only the center disk 14a is powered and the left and right side disks 14b, 14c are driven by the powered center disk 14a. If the crop were positioned at the right side of the harvester 10, the center disk 14a would rotate counter clockwise and the left and right side disks 14b, 14c would rotate clockwise.

The crop dividers 16 divide the crops into separate rows to prevent uprooting of the crops. The knockdown roller 18 pushes the crop forward so that the base cutters 26 cut the crops at the ground level. The base cutters 26 cut the crop in a substantially horizontal plane. The side knives 24 cut the crop in a vertical plane substantially parallel with a travel path of the harvester 10. In FIG. 2, the unharvested crop is positioned on the left of the harvester 10. In some embodiments, only the crop divider 16, the side knife 24 and the base cutter 26 on the left side of the harvester 10 are operating while the unharvested crop is positioned on the left of the harvester 10. In some embodiments, both the left and right sides of the crop divider 16, the side knives 24 and the base cutters 26 can operate while the unharvested crop is positioned on the left side of the harvester 10.

After the crop has been cut by the base cutter 26, the feed rollers 28 move the harvested crop toward the chopper 30 to chop the harvested crop into shorter lengths and move the shorter lengths of the harvested crop into the basket 32.

The primary extractor 34 includes a hood and a fan to move leaves out of the hood such that the leaves are not directed into the basket 32. The primary extractor 34 can be pivoted to direct the leaves to the headland or previously-harvested portion of the field. FIG. 2 illustrates the primary extractor 34 oriented to direct leaves to the lower right (relative to FIG. 2). If the unharvested crop is positioned to the right of the harvester 10, the primary extractor 34 would pivot to direct leaves to the lower left (relative to FIG. 2).

The illustrated conveyor 36 is a slat conveyor that moves crops from the basket 32 and into the wagon 12. In FIG. 2, the conveyor 36 extends from left to right to direct the harvested crops into the wagon 12. The conveyor 36 extends away from the unharvested crops because the wagon 12 travels over the previously-harvested crops. If the unharvested crop were positioned on the right side, then the conveyor 36 would extend toward the left (relative to FIG. 2). In some embodiments, the illustrated conveyor 36 includes a plurality of slats to move crops up the conveyor. In some embodiments, the conveyor 36 is an auger.

The secondary extractor 38 includes a hood and a fan to move any remaining leaves out of the hood such that the leaves are not directed into the wagon 12. In FIG. 2, the secondary extractor 38 directs leaves down and to the left. If the unharvested crop were positioned on the right side, then the secondary extractor 38 would direct leaves down and to the right.

The first sensor 42 is positioned on a roof of the vehicle cab 20 and is configured to sense a travel speed of the harvester 10. The first sensor 42 can sense the travel speed of the harvester 10 by sensing a speed of rotation of the ground-engaging implements (such as tracks or wheels) or can connecting via one or more satellites to a global positioning system (GPS). In some embodiments, the first sensor 42 is an inertial measurement unit. The first sensor 42 is electrically connected to the controller 50 to communicate the sensed speed to the controller 50 via a wired and/or wireless connection. In some embodiments, the first sensor 42 communicates a signal to the controller 50 that includes data and/or power.

The second sensor 44 is positioned on a roof of the vehicle cab 20 and is configured to sense at least one of a roll, a pitch and a yaw of the harvester 10. In some embodiments, the roll, pitch and yaw are displayed to a user on gauges on the user interface 48. The roll is calculated as rotation along a longitudinal axis extending in the direction of travel, the pitch is rotation about a horizontal axis perpendicular to the direction of travel and the yaw is rotation about a substantially vertical axis. In some embodiments, the second sensor 44 is an inertial measurement unit or a terrain compensation module. The second sensor 44 is electrically connected to the controller 50 to communicate the sensed pitch, roll and yaw to the controller 50 via a wired and/or wireless connection. In some embodiments, the second sensor 44 communicates a signal to the controller 50 that includes data and/or power. In some embodiments, the second sensor 44 is an inertial measurement unit that measures movement about axes corresponding to the vehicle pitch, roll and yaw. In other embodiments, a gyroscope and accelerometer combination is utilized to sense the pitch, roll and yaw of the harvester 10.

The third sensor 46 senses a position of the conveyor 36 with respect to main body of the harvester 10. The third sensor 46 can be a proximity sensor, a camera, an inertial measurement unit or other suitable mechanism to determine the position of the conveyor with respect to the main body of the harvester 10. The third sensor 46 can sense both an angular position about a vertical axis and an angular position about a horizontal axis (which corresponds to a height of the conveyor 36 above the ground surface) of the conveyor 36 with respect to the main body of the harvester 10. The third sensor 46 is electrically connected to the controller 50 to communicate the sensed position of the conveyor 36 with respect to the main body of the harvester 10 to the controller 50 via a wired and/or wireless connection. In some embodiments, the third sensor 46 communicates a signal to the controller 50 that includes data and/or power.

The user interface 48 includes one or more features in which a user can interact with the controller 50. The user interface 48 includes a steering device (such as a steering wheel, joysticks, etc.) and a touch screen. The touch screen offers several options, such as a cutting mode selection device and a cutting method selection device. The user interface 48 is electrically connected to the controller 50 to communicate with the controller 50 via a wired and/or wireless connection. The controller 50 can control movement and operation of various components of the harvester 10 in response to input from the sensors 42, 44 and 46 as well as input from a user via the user interface 48. For example, the user can select a cutting mode of operation. The user interface also includes gauges that display pitch, yaw and roll of the vehicle as sensed by the second sensor 44.

Figure 3:
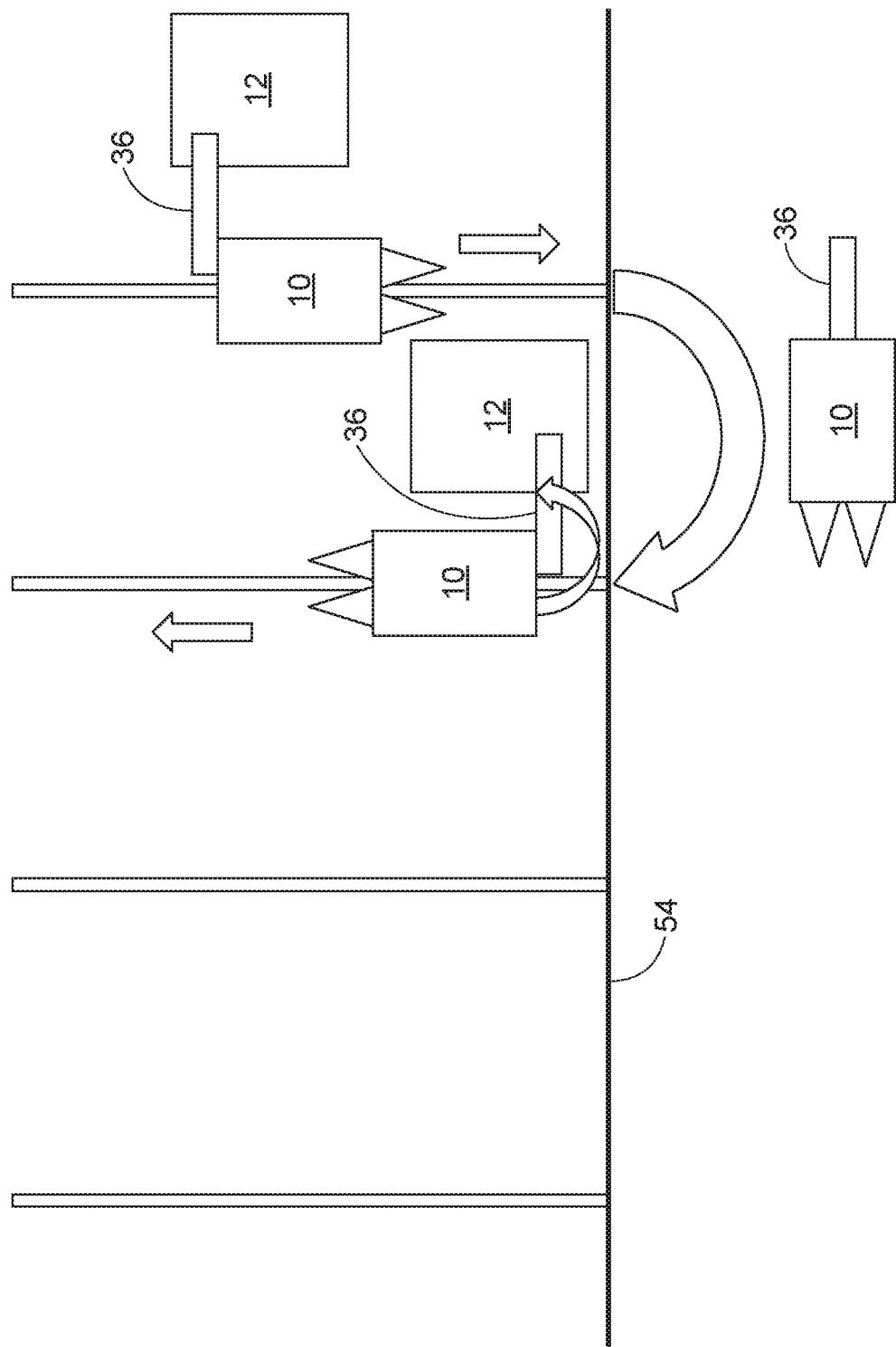
FIG. 3 is a schematic view of a circular cutting mode.

FIG. 3 illustrates a face cutting mode which is one possible cutting mode the user can select. This may also be referred to as a zigzag cutting mode. In the face cutting mode, the crop alternates between being positioned at the right of the harvester 10 and the left of the harvester 10. For example, when the harvester 10 is traveling downward in FIG. 3 toward a field boundary 54, the crop is positioned to the right of the operator in the cab 20 and the conveyor 36 is positioned to the left of the operator. When the harvester 10 is traveling upward in FIG. 3 away from the field boundary 54, the crop is positioned to the left of the operator so the conveyor 36 is positioned to the right of the operator. In the face cutting mode, the conveyor 36 alternates between being positioned to the right or the left of the operator in the cab 20.

Figure 4:
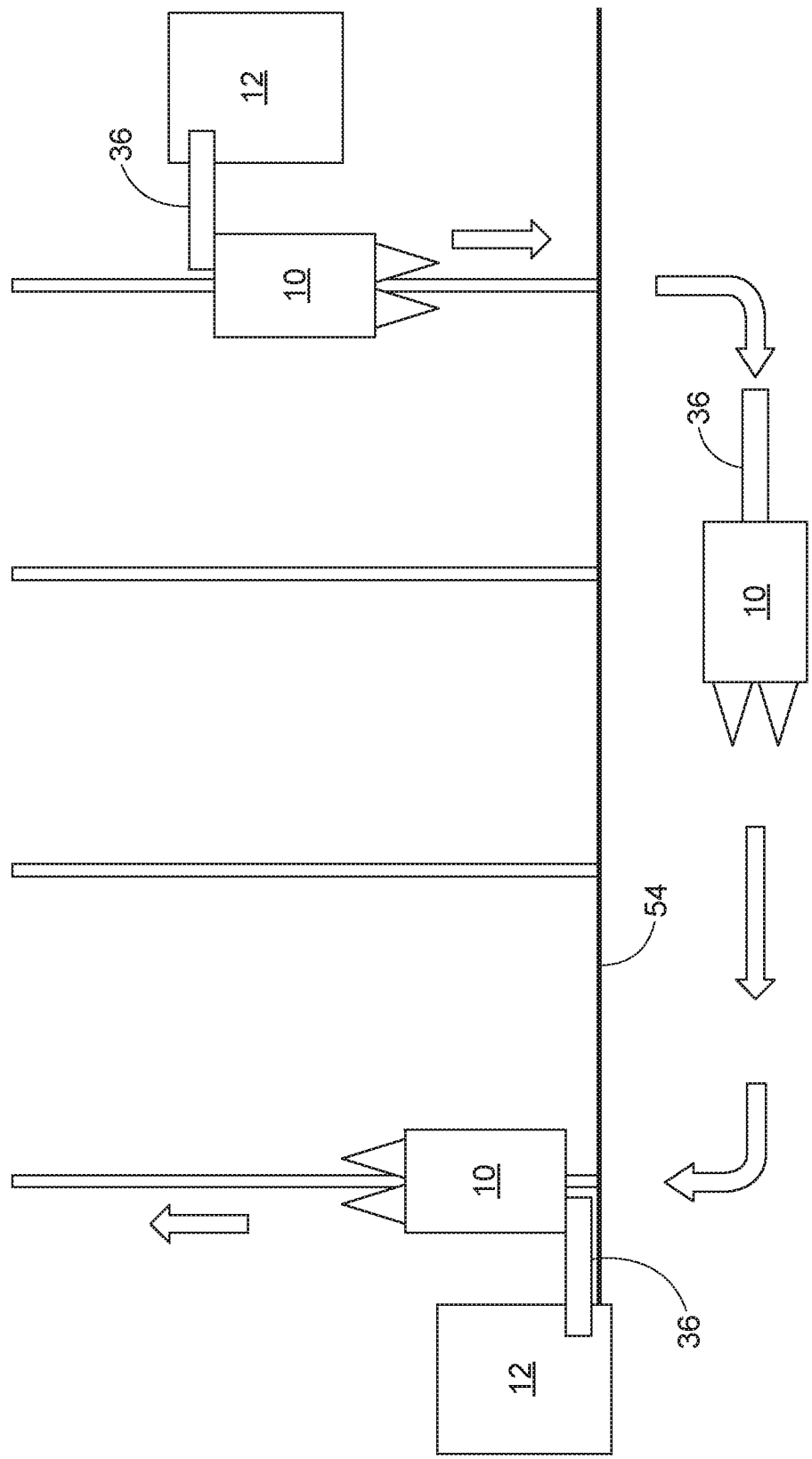
FIG. 4 is a schematic view of a face cutting mode.

FIG. 4 illustrates circular cutting mode which is another possible cutting mode the user can select. In the circular cutting mode, the crop is always positioned on the same side of the harvester 10 with respect to the operator in the cab 20. In FIG. 4, the crop is positioned on the right side of the harvester 10. The controller 50 can send electronic signals to various components of the harvester 10 to move them into the appropriate position for cutting when the harvester 10 is cutting and into the travel or stowed position when the harvester 10 is traveling between cutting rows. In one embodiment, the conveyor 36 is maintained in the same position during operation, see FIG. 5. For example, the conveyor 36 always extends to the left of the operator while cutting in FIG. 5.

The controller 50 can also receive an input from the user selecting a crop position with respect to the harvester 10. For example, the crop can be positioned to the left of the harvester 10 and the user can select a crop-at-left crop position, or the crop can be positioned at the right of the harvester 10 and the user can select a crop-at-right position.

In some embodiments, the harvester 10 can harvest more than one row of crops at a time. Such two-row harvesters include three crop dividers 16 as well as other components. The controller 50 can control operation of the components of two-row harvesters in some embodiments. Some harvesters can harvest more than two rows in each pass and the controller 50 can control operation of the components of such harvesters.

The controller 50 can use the inputs from the user regarding the cutting mode (circular cutting mode or face cutting mode) and the crop position (crop-at-left or crop-at-right) to determine a future crop position relative to the harvester 10.

The actuator 52 is connected to the conveyor 36 and to the body of the harvester 10. The actuator 52 rotates the conveyor 36 with respect to the body of the harvester 10 in response to one or more signals from the controller 50. In some embodiments, the actuator 52 rotates the conveyor 36 with respect to the harvester 10 about a vertical axis. In some embodiments, the actuator 52 also rotates the conveyor 36 with respect to the harvester 10 about a horizontal axis. In some embodiments, a second actuator is used to rotate the conveyor 36 with respect to the harvester about the horizontal axis.

When operating the harvester 10 on steep slopes or uneven terrain, the harvester 10 could be in a non-ideal unloading condition and/or operating at a non-ideal speed. While operating on steep slopes or uneven terrain, the user has to judge vehicle stability according to the position of the conveyor 36 and the slope of the terrain. The center of gravity of the harvester 10 can shift to one side of harvester 10 based upon the position of the conveyor, the incline of the terrain and the uneven nature of the terrain. This change in center of gravity of the harvester 10 could lead to instability, such as capsizing or other downfalls, such as cutting the sugar cane at a non-ideal height above the ground surface. This instability is increased upon turning the vehicle between harvesting rows. The operator typically uses visual monitoring while turning the harvester 10. This is tedious, time-consuming, and can be detrimental to the harvest and/or the harvester 10.

Figure 6:
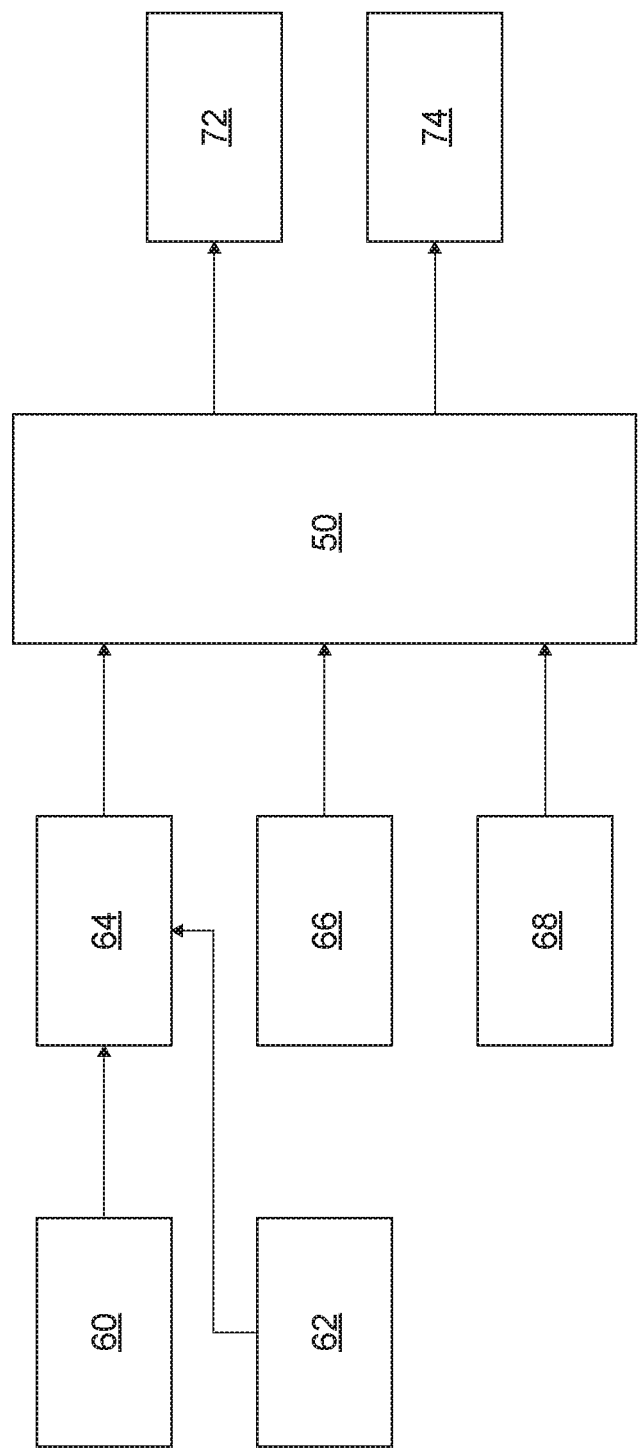
FIG. 6 is a flow chart of one possible mode of operation of the harvester of FIG. 1.

FIG. 6 illustrates one possible mode of automating the turning operation of the harvester 10. Box 60 is the operator input for initiating a vehicle turn, such as by selecting an end-of-row option. Box 62 is the input from the second sensor 44 regarding an angle of the terrain (which corresponds to the roll and pitch of the harvester 10). Box 64 is input from the third sensor 46 regarding the position of the conveyor 36 (which corresponds to the yaw of the harvester 10). Box 66 is the input from the third sensor 46 regarding the position of the conveyor 36 with respect to the harvester 10 before turning the harvester 10. Box 68 is the input regarding the steering angle sensor which corresponds to turning 180 degrees (like in FIG. 4) or to turning 90 degrees (like in FIG. 5). These inputs are communicated to the controller 50 via wired and/or wireless communication. The controller 50 then supplies at least one of two outputs: box 72 which is a signal to the actuator 52 to move the conveyor 36, and box 74 which is a signal to the user interface 48 to alert the user to move the conveyor 36.

Figure 7:
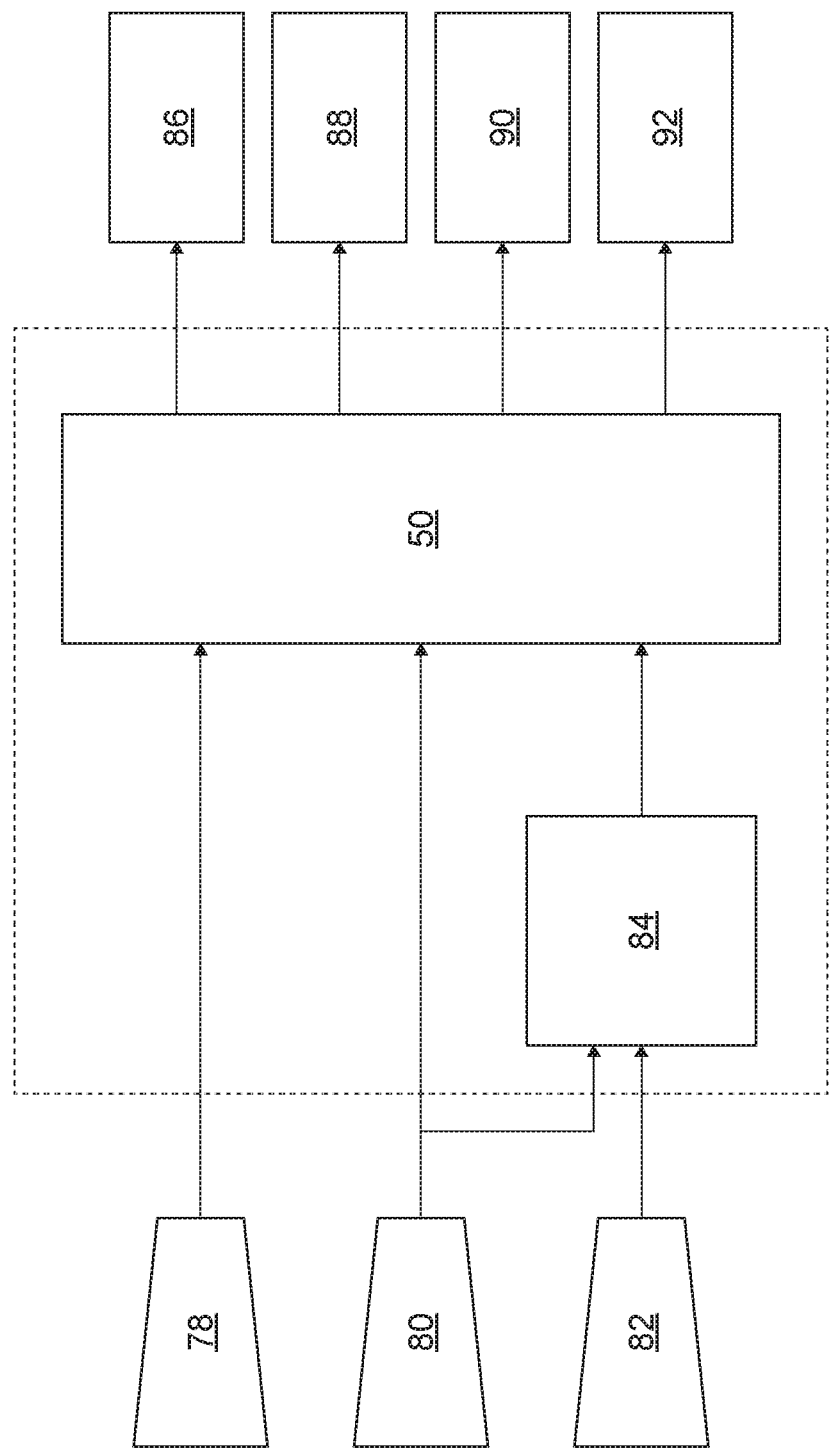
FIG. 7 is a flow chart illustrating one possible mode of operation of the harvester of FIG. 1.

FIG. 7 illustrates one possible mode of automating the turning operation of the harvester 10. Input 78 includes the vehicle speed which is sensed by the first sensor 42 and communicated to the controller 50. Input 80 includes a position of the conveyor 36 with respect to a main body of the harvester 10 which is sensed by the third sensor 46 and communicated to the controller 50. Input 82 includes a pitch, roll and optionally a yaw of the harvester 10 sensed by the second sensor 44 and communicated to the controller 50. The input 80 and the input 82 are communicated to the controller 50 and are utilized to calculate a center of gravity of the harvester 10 at output 84. The controller 50 sends one or more signals in response to the inputs 78, 80 and 82 as well as the calculated center of gravity of the harvester 10 at output 84. The controller 50 sends a first signal at output 86 to the actuator 52 to move the conveyor 36 if the calculated center of gravity of the harvester 10 is outside of an acceptable center of gravity range. The controller 50 sends a second signal at output 88 to the engine 22 to reduce the power output of the engine 22 to thereby reduce the speed of the harvester 10 if the sensed speed is greater than an acceptable range of speeds based upon the calculated center of gravity of the harvester 10. The controller sends a third signal at output 90 to direct various components of the harvester 10 to move in response to input from the user. For example, at the end of the row many of the vehicle components are raised for transport, and at the beginning of the row many of the vehicle components are lowered for harvesting. The controller sends a fourth signal at a output 92 to the user interface to instruct the user to reduce the speed of the vehicle and/or to move the conveyor 36 with respect to the main body of the harvester 10. For example, the fourth signal can include an alert on the user interface instructing the operator to move the conveyor 36 a certain number of degrees clockwise or counterclockwise and/or to reduce the speed of the vehicle to a certain speed.

Figure 8:
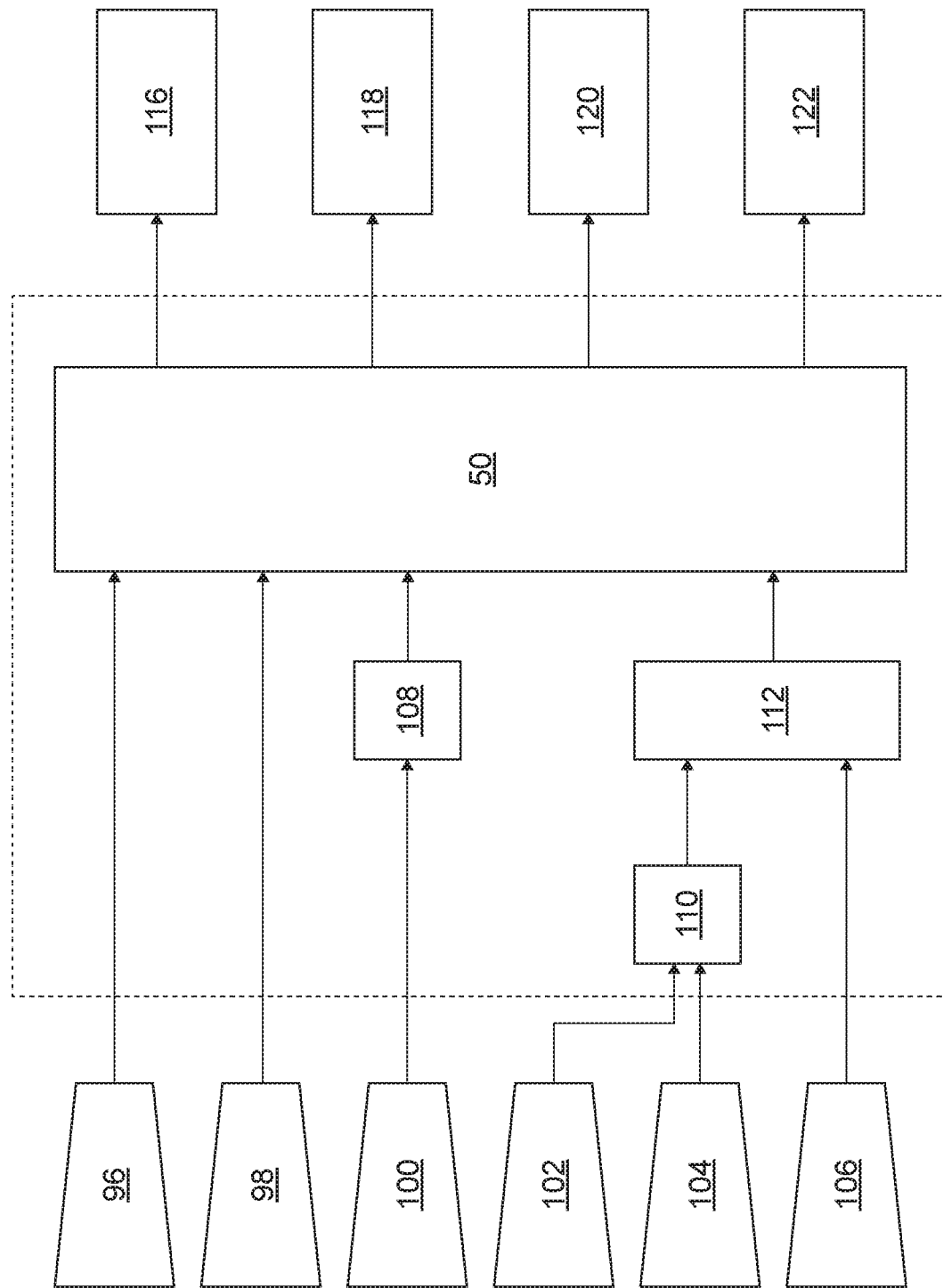
FIG. 8 is a flow chart illustrating one possible mode of operation of the harvester of FIG. 1.

FIG. 8 illustrates another possible mode of automating the turning operation of the harvester 10. Input 96 includes the vehicle speed which is sensed by the first sensor 42 and communicated to the controller 50. Input 98 includes a position of the conveyor 36 with respect to a main body of the harvester 10 which is sensed by the third sensor 46 and communicated to the controller 50. Input 100 includes information regarding a position of the wagon 12 with respect to the harvester 10. The wagon 12 communicates with the controller 50 via a wireless communication method to determine a position of the wagon 12 with respect to the harvester 10. Input 102 includes a pitch, roll and optionally a yaw of the harvester 10 sensed by the second sensor 44 and communicated to the controller 50. Input 104 includes a steering input from a user via a steering wheel and/or joystick(s). Input 106 includes an input from a user regarding the selection of a cutting mode. The cutting mode can be end-of-row or return-to-cut.

The input 96 (vehicle speed) and the input 98 (position of the conveyor 36) are communicated to the controller 50. Input 100 regarding the wagon position is communicated to the controller 50 along with input 108 which is the position of the conveyor 36 during harvesting the previous row. Input 102 (sensed vehicle yaw, pitch and/or roll) as well as input 104 (steering input) are communicated to the controller 50 in view of input 110 which is a vehicle turn detection selected by the user (i.e., is the harvester 10 turning 90 degrees or 180 degrees between rows). Input 106 (user selection of cutting mode) and input 110 are communicated to the controller 50 via a cutting method detection input 112.

The controller 50 sends multiple signals in response to the inputs 96, 98, 100, 102, 104, 106, 108, 110 and 112. The controller 50 sends a first signal at output 116 to the actuator 52 to move the conveyor 36 if the calculated center of gravity of the harvester 10 is outside of an acceptable center of gravity range. The controller 50 sends a second signal at output 118 to the engine 22 to reduce the power output of the engine 22 to thereby reduce the speed of the harvester 10 if the sensed speed is greater than an acceptable range of speeds based upon the calculated center of gravity of the harvester 10. The controller sends a third signal at output 120 to direct various components of the harvester 10 to move in response to input from the user. For example, at the end of the row, many of the vehicle components are raised for transport, and at the beginning of the row, many of the vehicle components are lowered for harvesting. The controller sends a fourth signal at output 122 to the user interface to instruct the user to reduce the speed of the vehicle and/or to move the conveyor 36 with respect to the main body of the harvester 10. For example, the fourth signal can include an alert on the user interface instructing the operator to move the conveyor 36 a certain number of degrees clockwise or counterclockwise and/or to reduce the speed of the vehicle to a certain speed.

In some embodiments, the conveyor 36 can be moved automatically in response to the user selecting end-of-row operation and then turning the steering wheel or moving the joystick(s). In these embodiments, the controller 50 can determine if the moving conveyor 36 will contact the wagon 12. If the controller 50 determines that the moving conveyor 36 will contact the wagon 12, the controller 50 is configured to send a signal to the actuator 52 to wait a set time before moving the conveyor 36 to the desired position.

In some embodiments, a rapid change in the pitch and/or roll of the harvester 10 can cause the controller 50 to send a signal to reduce the speed of the harvester and/or to move the conveyor 36 with respect to the vehicle body. A rapid change in the pitch and/or roll is likely indicative of the harvester 10 lacking suitable stability. In order to retain the necessary stability for optimal operation, the controller 50 can reduce the speed of the harvester and/or move the conveyor 36 with respect to the vehicle body.

The disclosure provides, among other things, methods of automating a turning operation of a harvester 10 including sensing a vehicle speed and calculating a center of gravity of the harvester 10. The speed can be reduced, the position of the conveyor with respect to the vehicle body of the harvester 10 can be adjusted, the user can be instructed to reduce the vehicle speed and/or the user can be instructed to rotate the conveyor with respect to the vehicle body in response to the sensed speed being too fast for the calculated center of gravity.

What is claimed is:
1. A control system for a harvester, the harvester including a vehicle body and a conveyor rotatably connected to the vehicle body, the control system comprising:
a first sensor for sensing a speed of the harvester;
a second sensor for sensing a pitch and a yaw of the vehicle body;
a third sensor for sensing a position of the conveyor with respect to the vehicle body;
an actuator connected to the conveyor and the vehicle body, the actuator configured to rotate the conveyor with respect to the vehicle body; and
a controller in electrical communication with the first sensor, the second sensor, the third sensor and the actuator, the controller configured to
receive a first signal from the first sensor indicative of the speed of the harvester,
receive a second signal from the second sensor indicative of the pitch and the yaw of the vehicle body,
compare the sensed pitch of the vehicle body with respect to an acceptable range of pitch positions of the vehicle body, compare the sensed yaw of the vehicle body to an acceptable range of yaw positions of the vehicle body,
receive a third signal from the third sensor indicative of the position of the conveyor and with respect to the vehicle body,
compare the sensed position of the conveyor with respect to the vehicle body to an acceptable range of conveyor positions,
calculate a center of gravity of the harvester based upon to the second signal and the third signal,
compare the sensed speed of the harvester to an acceptable range of speeds based upon the calculated center of gravity of the harvester, and
send a signal to execute at least one action from the following subset of actions in response to the sensed speed of the harvester being greater than the acceptable range of speeds based upon the calculated center of gravity of the harvester,
move the conveyor to a desired position with respect to the vehicle body,
alert a user to move the conveyor with respect to the vehicle body,
reduce the speed of the harvester, and
alert the user to reduce the speed of the harvester.

2. The control system of claim 1, further comprising a fourth sensor for sensing a position of a wagon with respect to the vehicle body, the fourth sensor being in electrical communication with the controller to send a fourth signal to the controller.

3. The control system of claim 2, wherein the second sensor is further configured to sense a roll of the vehicle body, and the controller is further configured to compare the sensed roll of the vehicle body to an acceptable range of roll positions, and to calculate the center of gravity of the harvester based upon the second signal, the third signal and the fourth signal.

4. The control system of claim 3, wherein alerting the user to move the conveyor with respect to the vehicle body includes providing the user with a specific angle to rotate the conveyor clockwise or counterclockwise.

5. The control system of claim 4, further comprising a user interface including a steering device, a cutting method selection device, and a cutting mode selection device, and wherein the controller is further configured to compare a first input from the steering device to an acceptable turning radius based upon the sensed speed of the harvester and the calculated center of gravity of the harvester.

6. The control system of claim 5, wherein the controller is further configured to send a signal to the actuator to move the conveyor with respect to the vehicle body in response to at least one input of the following subset of inputs: a first input from the steering device, a second input from the cutting method selection device, or a third input from the cutting mode selection device.

7. The control system of claim 6, wherein the second input is one of an end of row event or a return to cut event, and wherein the third input is one of a circular cutting mode or a zig-zag cutting mode.

8. The control system of claim 7, wherein the controller is further configured to determine if the moving conveyor will contact the wagon, and if the controller determines that the moving conveyor will contact the wagon, the controller is configured to send a signal to the actuator to wait a set time before moving the conveyor to the desired position.

9. A control system for a harvester, the harvester including a vehicle body and a conveyor rotatably connected to the vehicle body, the control system comprising:
a first sensor for sensing a speed of the harvester;
a second sensor for sensing a pitch and a roll of the vehicle body;
a third sensor for sensing a position of the conveyor with respect to the vehicle body;
an actuator connected to the conveyor and the vehicle body, the actuator configured to rotate the conveyor with respect to the vehicle body;
a user interface including a steering device, a cutting method selection device, and a cutting mode selection device; and
a controller in electrical communication with the first sensor, the second sensor, the third sensor, the actuator and the user interface, the controller configured to
receive a first signal from the first sensor indicative of the speed of the harvester,
receive a second signal from the second sensor indicative of the pitch and the roll of the vehicle body,
compare the sensed pitch of the vehicle body to an acceptable range of pitch positions of the vehicle body,
compare the sensed roll of the vehicle body to an acceptable range of roll positions of the vehicle body,
receive a third signal from the third sensor indicative of the position of the conveyor and with respect to the vehicle body,
compare the sensed position of the conveyor with respect to the vehicle body to an acceptable range of conveyor positions,
calculate a center of gravity of the harvester based upon to the second signal and the third signal,
compare the sensed speed of the harvester to an acceptable range of speeds based upon the calculated center of gravity of the harvester,
compare a first input from the steering device to an acceptable turning radius based upon the sensed speed of the harvester, and the calculated center of gravity of the harvester,
send a signal to execute at least one action of the following subset of actions in response to the sensed speed of the harvester being greater than an acceptable speed based upon the calculated center of gravity of the harvester,
move the conveyor with respect to the vehicle body,
alert a user to move the conveyor with respect to the vehicle body,
reduce the speed of the harvester, and
alert the user to reduce the speed of the harvester,
determine a desired position of the conveyor with respect to the vehicle body based upon a second input from the cutting method selection device, and a third input from the cutting mode selection device, and
send a signal to the actuator to move the conveyor to the desired position.

10. The control system of claim 9, wherein the controller is further configured to send a signal to the actuator to move the conveyor with respect to the vehicle body in response to at least one of the following: a second input from the cutting method selection device, or a third input from the cutting mode selection device.

11. The control system of claim 10, wherein the second input is one of an end of row event or a return to cut event, and wherein the third input is one of a circular cutting mode or a zig-zag cutting mode.

12. The control system of claim 9, wherein the controller is further configured to receive a signal indicative of a position of a wagon, to determine if the moving conveyor will contact the wagon, and if the controller determines that the moving conveyor will contact the wagon, the controller is configured to send a signal to the actuator to wait a set time before moving the conveyor to the desired position.

13. A harvester comprising:
a vehicle body;
a conveyor rotatably connected to the vehicle body;
an actuator configured to rotate the conveyor with respect to the vehicle body;
a first sensor for sensing a speed of the harvester;
a second sensor for sensing yaw, pitch and roll of the vehicle body;
a third sensor for sensing a position of the conveyor with respect to the vehicle body; and
a controller in electrical communication with the actuator, the first sensor, the second sensor and the third sensor, the controller configured to
receive a first signal from the first sensor indicative of the speed of the harvester,
receive a second signal from the second sensor indicative of the pitch, the yaw and the roll of the vehicle body,
compare the sensed yaw of the vehicle body to an acceptable yaw range,
compare the sensed pitch of the vehicle body to an acceptable pitch range,
compare the sensed roll of the vehicle body to an acceptable roll range,
receive a third signal from the third sensor indicative of the position of the conveyor and with respect to the vehicle body,
compare the sensed position of the conveyor with respect to the vehicle body to an acceptable range of conveyor positions,
calculate a center of gravity of the harvester based upon to the second signal and the third signal,
compare the sensed speed of the harvester to an acceptable range of speeds based upon the calculated center of gravity of the harvester, and
send a signal to execute at least one action of the following subset of actions when the sensed speed of the harvester is greater than an acceptable speed based upon the calculated center of gravity of the harvester,
move the conveyor with respect to the vehicle body,
alert a user to move the conveyor with respect to the vehicle body,
reduce the speed of the harvester, and
alert the user to reduce the speed of the harvester.

14. The harvester of claim 13, further comprising a first gauge for displaying the sensed yaw of the vehicle body to an operator, a second gauge for displaying the sensed pitch of the vehicle body to the operator, and a third gauge for displaying the sensed roll of the vehicle body to the operator.

15. The harvester of claim 13, further comprising a fourth sensor for sensing a position of a wagon with respect to the vehicle body, the fourth sensor in electrical communication with the controller, wherein the controller is further configured to receive a fourth signal indicative of the sensed position of the wagon with respect to the harvester.

16. The harvester of claim 15, wherein alerting the user to move the conveyor with respect to the vehicle body includes providing the user with a specific angle to rotate the conveyor clockwise or counterclockwise.

17. The harvester of claim 13, further comprising a user interface including a steering device, a cutting method selection device, and a cutting mode selection device.

18. The harvester of claim 17, wherein the controller is further configured to compare a first input from the steering device to an acceptable turning radius based upon the calculated center of gravity of the harvester.

19. The harvester of claim 17, wherein the controller is further configured send a signal to the actuator to move the conveyor with respect to the vehicle body in response to at least one of the following: a second input from the cutting method selection device, or a third input from the cutting mode selection device.

20. The harvester of claim 17, wherein the second input is one of an end of row event or a return to cut event, and wherein the third input is one of a circular cutting mode or a zig-zag cutting mode.

* * * * *